US009168838B2

(12) United States Patent
Kuribayashi et al.

(10) Patent No.: US 9,168,838 B2
(45) Date of Patent: Oct. 27, 2015

(54) CHARGING CONTROL SYSTEM AND CHARGING CONTROL METHOD

(75) Inventors: Ryosuke Kuribayashi, Tokyo (JP); Hitoshi Yano, Tokyo (JP); Koji Kudo, Tokyo (JP)

(73) Assignee: NEC Corporation, Tokyo (JP)

( * ) Notice: Subject to any disclaimer, the term of this patent is extended or adjusted under 35 U.S.C. 154(b) by 852 days.

(21) Appl. No.: 13/409,004

(22) Filed: Feb. 29, 2012

(65) Prior Publication Data

US 2013/0057211 A1 Mar. 7, 2013

(30) Foreign Application Priority Data

Sep. 1, 2011 (JP) ................. 2011-190656

(51) Int. Cl.
*H02J 7/00* (2006.01)
*B60L 11/18* (2006.01)
*H02J 7/04* (2006.01)

(52) U.S. Cl.
CPC ........... *B60L 11/1816* (2013.01); *B60L 11/184* (2013.01); *B60L 11/185* (2013.01); *B60L 11/1824* (2013.01); *B60L 11/1842* (2013.01); *B60L 11/1844* (2013.01); *B60L 11/1846* (2013.01); *H02J 7/0027* (2013.01); *H02J 7/041* (2013.01); *B60L 2230/30* (2013.01);
(Continued)

(58) Field of Classification Search
CPC ............ Y02T 10/7005; Y02T 10/7088; Y02T 90/168; H02J 7/0027
USPC ......................................... 320/104, 109, 134
See application file for complete search history.

(56) References Cited

U.S. PATENT DOCUMENTS

| 2002/0070705 A1 | 6/2002 | Buchanan et al. |
| 2004/0130292 A1 | 7/2004 | Buchanan et al. |
| 2010/0231164 A1 | 9/2010 | Yang |
| 2011/0074350 A1* | 3/2011 | Kocher ................. 320/109 |

FOREIGN PATENT DOCUMENTS

| JP | 2000-209707 A | 7/2000 |
| JP | 2006-020438 A | 1/2006 |

(Continued)

OTHER PUBLICATIONS

G.K. Venayagamoorthy et. al. ,"Real-Time Modeling of Distributed Plug-in Vehicles for V2G Transactions", Energy Conversion Congress and Exposition, 2009. ECCE 2009. IEEE, 3937-3941(2009).

(Continued)

*Primary Examiner* — Edward Tso
*Assistant Examiner* — Aaron Piggush
(74) *Attorney, Agent, or Firm* — McGinn IP Law Group, PLLC

(57) ABSTRACT

Charging control section 17 controls charging such that when the charging of an EV satisfies a predetermined condition, the EV is charged with electricity from a stationary energy storage and when the charging of the EV does not satisfy the predetermined condition, the EV is charged with electricity from an electric power grid and information communication grid 1 and the stationary energy storage is charged from electric power grid and information communication grid 1 based on the state of stored electricity of the stationary energy storage. Charging scheduling section 15 performs scheduling for the EV based on an electric power demand that cause electric power grid and information communication grid 1 to charge the EV with electricity, the electric power demand including electric power demand created by charging performed under the control of charging control section 17.

2 Claims, 3 Drawing Sheets

(52) U.S. Cl.
CPC .......... *B60L2230/40* (2013.01); *B60L 2240/70* (2013.01); *B60L 2240/80* (2013.01); *B60L 2260/52* (2013.01); *B60L 2260/54* (2013.01); *B60L 2260/58* (2013.01); *Y02E 60/721* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

FOREIGN PATENT DOCUMENTS

| | | |
|---|---|---|
| JP | 2007-535282 A | 11/2007 |
| JP | 2009-247090 A | 10/2009 |
| JP | 2010-213560 A | 9/2010 |
| JP | 2010-231258 A | 10/2010 |
| JP | 2011-083165 A | 4/2011 |

OTHER PUBLICATIONS

Ryosuke Kuribayashi, et al., "Electricity-Charge-Control Enabling-Technology of a Hung Number of Electric Vehicles(Evs) for Balancing of the Electric Power Supply and Demand", 2010.

* cited by examiner

CHARGING CONTROL SYSTEM AND CHARGING CONTROL METHOD

BACKGROUND OF THE INVENTION

1. Field of the Invention

The present invention relates to a charging control system and a charging control method that applies to vehicles that run on electricity, the vehicles including hybrid type vehicles that are equipped with an non-electric power source.

2. Description of the Related Art

In that serious concern is being focused on environmental problems in recent years, it is thought that renewable power supplies such as photovoltaic power generator and wind power generators that are being rapidly implemented will become effective means to achieve low carbon society and solve energy resource problems. On the other hand, however, since such renewable power supplies have large output fluctuations, adjustment means need to be provided that offsets their output fluctuations from the standpoint of supplying quality power. To date, since thermal generators that have high response speeds have been implemented as the adjustment means, this results in a dilemma in which as renewable power supplies are increasingly implemented, more thermal power generators are needed as adjustment means. Thus, it will become an important problem to ensure alternative powerful adjustment means. Although it might be effective means to implement large capacity rechargeable batteries such as NaS batteries, they would have a very high implementation barrier from the implementation and operation cost perspectives.

V2G (Vehicle-to-Grid) techniques that cause rechargeable batteries equipped in vehicles, that run on electricity and that are expected to be rapidly popularized (hereinafter, these vehicles including hybrid type vehicles equipped with a non-electric power source are referred to as EVs (Electric Vehicles)) and chargers connected thereto to be linked, and to be used them as a virtual large capacity rechargeable battery that would stabilize the power system have been studied. V2G has been proposed since 1980s and research including estimation of macroscopic stabilization effects of the entire electric power grid have been continuously reported up to the present. In recent several years, microscopic control techniques that are used in the manufacturing of specific systems, namely those that individually control charging and discharging of many EVs in real time have been reported.

Examples include, Non-patent Literature 1 (G. K. Venayagamoorthy et. al., "Real-Time Modeling of Distributed Plug-in Vehicles for V2G Transactions," Energy Conversion Congress and Exposition, 2009. ECCE 2009. IEEE, 3937-3941 (2009)) presents a charging and discharging control method that performs optimum scheduling based on Particle Swarm Optimization (PSO) that sets up EV operation models, electric power grid models, time variation models of electric power prices, and so forth and that was inspired by movement of a shoal of fish.

Patent Literature 1 (JP2000-20977A, Publication) describes a configuration of an EV charging scheduling device and also mentions optimum charging schedule based on a genetic algorithm.

Patent Literature 2 (JP2010-213560A, Publication) describes a configuration that stably charges an EV using a stationary rechargeable battery that serves as an electric power buffer connected in series between the electric power grid and the EV without necessity to expand the capacity of the electric power grid side infrastructure.

Although a configuration that is expected not only to charge an EV with electricity but also to discharge it from the EV to the electric power grid side is also referred to as V2G, a configuration that is expected only to charge the EV with electricity might be referred to as G2V so as to distinguish itself from V2G. G2V would reduce the load imposed on the internal rechargeable battery provided in each EV because of a decrease in charging and discharging cycles.

However, to date, few practical systems that comprehensive evaluate the reduction of load and risk (imperfect charging upon departure and accelerated deterioration of rechargeable battery of EV) imposed on EVs' owners, the quality of grid stabilization service, real time response, decrease of load imposed on computational processes for optimum scheduling, and so forth have been reported. Thus, this situation has bottlenecked the implementation of multiple EVs linked to a charging control system.

Next, realistic problems with respect to charging schedule for EVs will be described.

As a first problem, if connection times at which EVs are connected to chargers (electric power grid) at daytime at temporary parking lots largely fluctuate and if their connection times are unexpectedly short, the charging schedule will not be implemented exactly as planned, and this will result in EVs that are not fully charged. Even if arrival times and departure times of EVs can be completely ensured, if the connection times are too short, since the degree of freedom with respect to shifting charging times is low, charging demands that occur in EVs would not be almost effectively used to stabilize the electric power grid and thereby they would be expected to simply become temporal peak noise of electric power demands or could concentrate to a time zone in which charge connection times are long (for example, night-time).

As a second problem, in a transitional period of popularization of EVs or if EV use times are irregularly patterned, since few or no EVs are connected to chargers (electric power grid), a time zone in which charging control can hardly be performed, namely, power demands that serve as an electric power adjustment capability are not supplied to the electric power supply (electric company) side, (this time zone is referred to as a dead time) could occur. In addition, before and after the dead time, since the number of EVs connected to the chargers (electric power grid) is small, it is likely that the load (rapid charging, imperfect charging, and so forth) concentrates on particular EVs.

FIG. 1a exemplifies a dead time that occurs in an ordinary multiple EV linked charging system and shows charger connection states that are generated at random for 50 EVs that are used for commuting for three days (one holiday and two weekdays). FIG. 1b exemplifies dead times that occur in an ordinary multiple EV linked charging system and shows that charging scheduling is performed such that charging demands of all EVs that arrived are adjusted in chronological order in the time zone in which the EVs stopped.

As shown in FIG. 1a, when EVs are not connected to chargers, they are running, namely they are consuming electric power. In FIG. 1a, the amounts of stored electricity of individual EVs at the beginning of the first day were randomly generated.

As shown in FIG. 1b, in a time zone in which EVs are running, namely they are not connected to chargers, dead times in which electric power (charging) demands cannot be controlled occur.

In the configuration described in Patent Literature 2, since a stationery rechargeable battery is connected in series between the electric power grid and the EV side, electric power supplied from the electric power grid is temporarily stored in the stationary rechargeable battery, and all EVs are charged with electricity through the stationary rechargeable battery, it would be necessary to provide a large capacity rechargeable battery that satisfies charging demands of nearly all the EVs although it would not be necessary to increase the rated capacity of an electric power system that is superior to the stationary rechargeable battery. Thus, it could be expected that both the initial cost and operation cost would remarkably increase.

Since charging demands that EVs create have the potential to prevent electric power demands from being forcibly created so as to stabilize the electric power grid, namely to prevent energy resources from being wasted and thereby to effectively use the saved energy for others. Thus, the charging demands of EVs could be considered to be a kind of "energy resources." In this context, latent electric power demands for the electric power grid that can chronologically shift demands to some extent are defined as electric power charging demand potentials.

SUMMARY OF THE INVENTION

The present invention has been made in view of the problems involved in the foregoing techniques and its object is to provide a charging control system and a charging control method that allow electric power demands to vary with respect to alleviation of load and risk imposed on EVs' owners and to improving the quality of system stabilization service.

To accomplish the foregoing object, the present invention is a charging control system that controls charging for a vehicle that runs on electricity, comprising:

at least one stationary rechargeable means;

charging means that charges said vehicle or said stationary rechargeable means with electricity;

detection means that detects states of charge of said vehicle and said stationary rechargeable means;

charging scheduling means that performs scheduling in which said charging means charges said vehicle based on an electric power demand that cause said charging means to charge said vehicle with electricity; and charging control means that controls said charging such that when said charging of said vehicle satisfies a predetermined condition, said vehicle is charged with electricity from said stationary rechargeable means and when the charging of said vehicle does not satisfy the predetermined condition, said vehicle is charged with electricity by said charging means and said stationary rechargeable means is charged with electricity by said charging means based on the state of stored electricity of said stationary rechargeable means detected by said detection means, wherein said charging scheduling means performs charging scheduling for said charging means that charges said vehicle and said stationary rechargeable means with electricity also based on an electric power demand created under the control of said charging control means.

In addition, the present invention is a charging control method for a charging control system, including: at least one stationary rechargeable means; and charging means that charges a vehicle that runs on electricity, comprising:

a charging control step that controls charging such that when said charging of said vehicle satisfies a predetermined condition, said vehicle is charged with electricity from said stationary rechargeable means and when the charging of said vehicle does not satisfy the predetermined condition, said vehicle is charged with electricity by said charging means and said stationary rechargeable means is charged with electricity by said charging means based on the state of stored electricity of said stationary rechargeable means; and a charging scheduling step that performs charging scheduling for said charging means that charges said vehicle with electricity also based on an electric power demand created by said charging means that charges said vehicle with electricity, said electric power demand including electric power demand created by charging performed under the control of said charging control step.

Since the present invention is configured as described above, it allows electric power demands to vary with respect to the alleviation of load and risk imposed on EVs' owners and to improving of the quality of system stabilization service.

BRIEF DESCRIPTION OF THE DRAWING

FIG. 2b is a schematic diagram showing a configuration of electric power aggregators shown in FIG. 2a.

DETAILED DESCRIPTION OF THE PREFERRED EMBODIMENTS

Next, with reference to the accompanying drawings, embodiments of the present invention will be described.

Figure 1A:
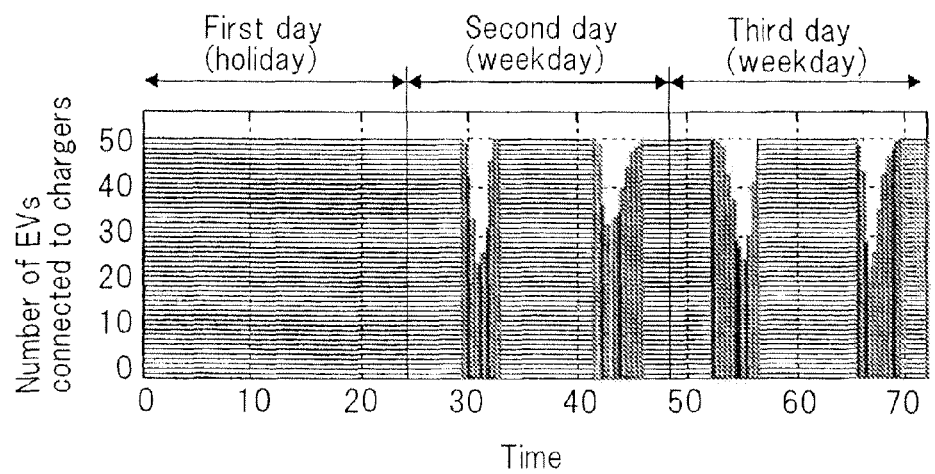
FIG. 1a exemplifies a dead time that occurs in an ordinary multiple EV linked charging system and shows charger connection states that are generated at random for 50 EVs that are used for commuting for three days (one holiday and two weekdays).
Figure 1B:
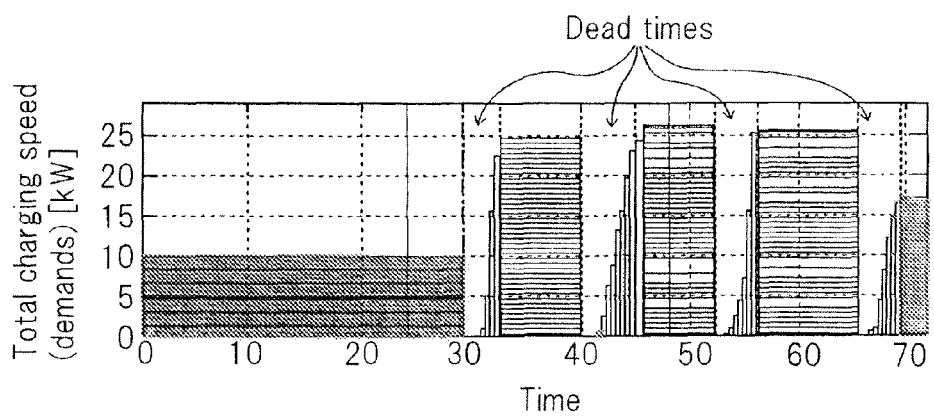
FIG. 1b exemplifies dead times that occur in an ordinary multiple EV linked charging system and shows that charging scheduling is performed such that charging demands of all EVs that arrived are adjusted in chronological order in the time zone in which the EVs stopped.
Figure 2A:
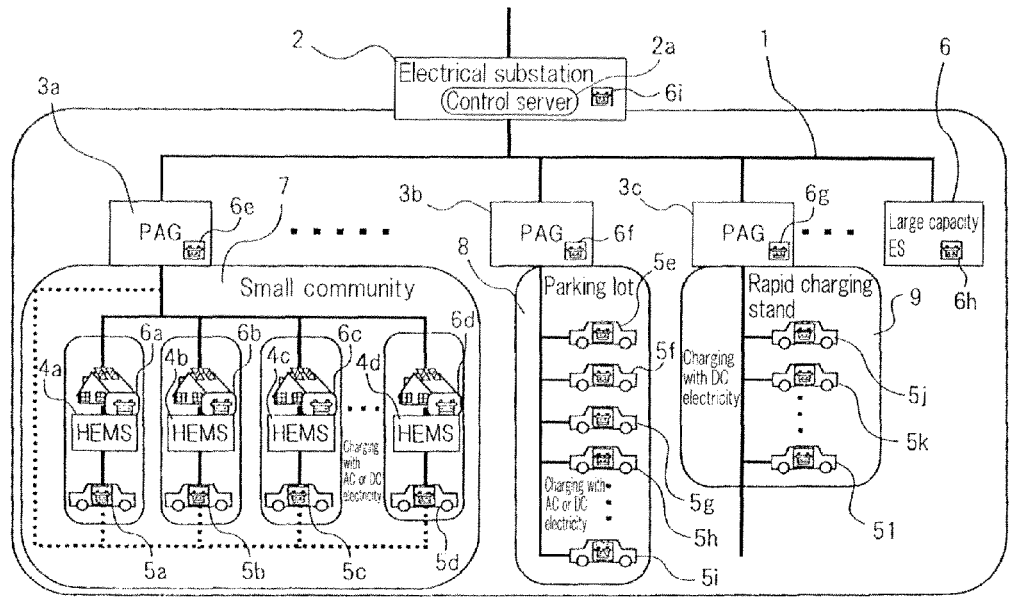
FIG. 2a is a schematic diagram showing an overall configuration exemplifying a charging environment for electric vehicles that implement a charging control system according to the present invention.
Figure 2B:
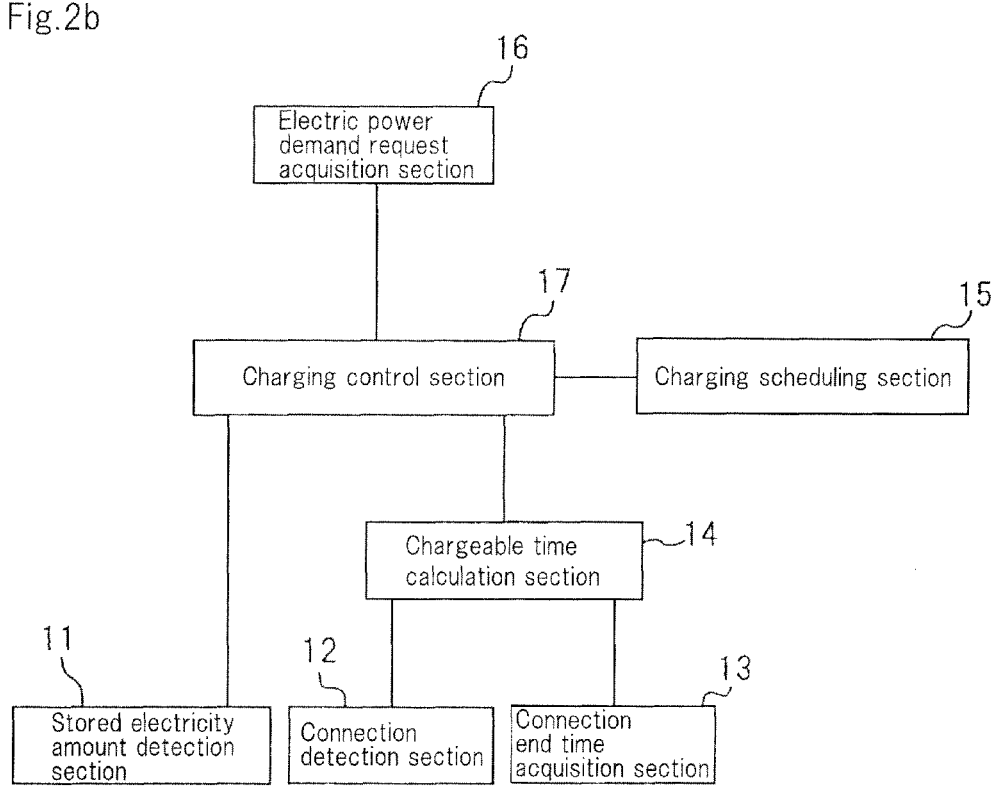

FIG. 2a is a schematic diagram showing an overall configuration exemplifying a charging environment for electric vehicles that implement a charging control system according to the present invention. FIG. 2b is a schematic diagram showing a configuration of electric power aggregators 3a to 3c shown in FIG. 2a.

In this example, as shown in FIG. 2a, electric power aggregators 3a, 3b, and 3c are located at small community 7, parking lot 8, and rapid charging stand 9, respectively, such that electric vehicles EV 5a to 5l are charged with electricity at small community 7, parking lot 8, and rapid charging stand 9. Electric power aggregators 3a, 3b, and 3c are connected to electrical substation 2 through electric power grid and information communication grid 1 that serves as charging means and electric power control server 2a is located in electrical substation 2. On the other hand, HEMSs (Home Energy Management Systems) 4a to 4d are located in small community 7 and also large capacity energy storage 6 is connected to electric power grid and information communication grid 1. Stationary energy storages 6a to 6i that serve as means that temporarily stores electric power charging demand potentials are distributively located in HEMSs 4a to 4d, electric power aggregators 3a, 3b, and 3c, large capacity energy storage 6, and electrical substation 2. Stationary energy storages 6a to 6i are for example rechargeable batteries located in individual users' houses, rechargeable batteries built in or located in electric power aggregators 3a, 3b, and 3c provided in the small community, parking lot, and rapid charging stand, a large capacity rechargeable battery (NaS battery or the like) located immediately downstream of electrical substation 2 and electric power grid and information communication grid 1.

As shown in FIG. 2b, electric power aggregators 3a, 3b, and 3c each are provided with stored electricity amount detection section 11, connection detection section 12, connection end time acquisition section 13, chargeable time calculation section 14, charging scheduling section 15, electric power demand request acquisition section 16, and charging control section 17. These constituent sections would be implemented by programs that are executed in electric power aggregators 3a, 3b, and 3c. Alternatively, they can be located in HEMSs 4a to 4d or the like.

In the charging control system that has the foregoing configuration, if the charging time for an EV from electric power grid and information communication grid 1 cannot be predicted or if it is predicted that an EV cannot be charged with electricity for a predetermined time or longer, not only will the EV be connected to electric power grid and information communication grid 1, but it will also be charged with electricity from stationary energy storage 6a, 6i under the control of charging control section 17 such that electric power charging demand potential that occurs are the EV is transferred to stationary energy storage 6a to 6i. Thus, the electric power charging demand potential is changed to an electric power charging demand potential that can be nearly freely chronologically shifted and charging scheduling section 15 can perform charging scheduling and charging control not only for ordinary EVs that can be connected to electric power grid and information communication grid 1 for a particular time, but also for stationary energy storages 6a to 6i.

If it is predicted that, since the number of EVs connected to electric power grid and information communication grid 1 is a predetermined number and is very small, a time zone in which charging control cannot be performed (dead time), will occur, EVs are charged with electricity from stationary energy storages 6a to 6i and electric power charging demand potentials that occur in the EVs are transferred to stationary energy storages 6a to 6i in a time zone in which the number of EVs connected to electric power grid and information communication grid 1 is large, and thus charging control can be sufficiently performed, namely electric power demand control can be performed and stationary energy storages 6a to 6i are charged with electricity in the dead time, and namely electric power demands are created under the control of charging control section 17.

In electric power grid and information communication grid 1, electric power aggregators 3a, 3b, and 3c are expected to be hub type devices that bind a plurality of power wires and information wires and are defined to include devices that have the functions of a transformer, scheduler, or buffer.

Next, a charging control method for the charging control system having the foregoing configuration will be described.

Figure 3:
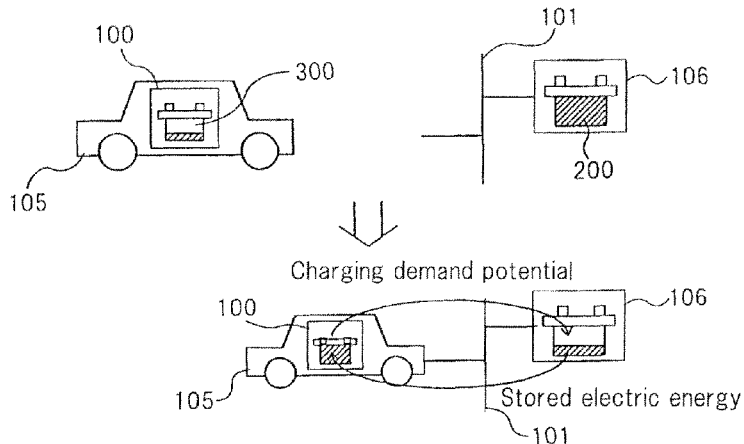
FIG. 3 is a schematic diagram describing that electric power charging demand potential is transferred in the charging environment for electric vehicles shown in FIG. 2a and FIG. 2b.

FIG. 3 is a schematic diagram describing that an electric power charging demand potential is transferred in the charging environment for electric vehicles shown in FIG. 2a and FIG. 2b.

As shown in FIG. 3, after EV 105 run, since it consumed electric power (discharged electricity) and the amount of stored electricity decreases, it needs to be charged with electricity. Thus, this means that EV 105 has electric power charging demand potential 300.

If the charging time for an EV by electric power grid and information communication grid 101 cannot be predicted or if it is predicted to be short, when the EV is connected to electric power grid and information communication grid 101, stored electric energy 200 is immediately transferred from stationary energy storage 106 to EV's internal rechargeable battery 100, namely, the EV is charged with electricity, under the control of charging control section 17. This means that electric power charging demand potential 300 is transferred to stationary energy storage 106. Once electric power charging demand potential 300 is transferred to stationary energy storage 106 that is connected to electric power grid and information communication grid 101 for 24 hours a day, the EV can be charged with electricity anytime, namely an electric power demand can be created. Thus, even if the departure time of the EV is uncertain or very soon, charging scheduling section 15 can effectively use electric power charging demand potential 300 that occurs in the EV so as to perform scheduling and thereby stabilize the electric power grid. In addition, since it is almost unlikely that the internal rechargeable battery of the EV has not been fully charged when it departs, the load and risk imposed on the EV's owner would be alleviated.

If few or no EVs are connected to electric power grid and information communication grid 101 and thereby if it is predicted that a time zone in which charging control cannot be performed (dead time) occurs, the EV's internal rechargeable battery 100 will be charged with electricity from stationary energy storage 106 that has been fully charged in a time zone in which the number of EVs connected to electric power grid and information communication grid 101 is large and thereby charging control can be sufficiently performed, namely electric power demand control can be performed, under the control of charging control section 17 such that electric power charging demand potential 300 that occurs in the EV is temporarily transferred to stationary energy storage 106 and stationary energy storage 106 is charged with electricity in the dead time, namely an electric power demand is created. Thus, dead times in which electric power demands that charging scheduling section 15 use to perform charging scheduling cannot be controlled could be eliminated. As a result, before and after a dead time in which the number of EVs connected to electric power grid and information communication grid 101 is small, since the load can be prevented from concentrating to a particular EV, the EV's owner can receive the benefits.

Next, a charging control method for the foregoing charging control system will be specifically described.

Figure 4:
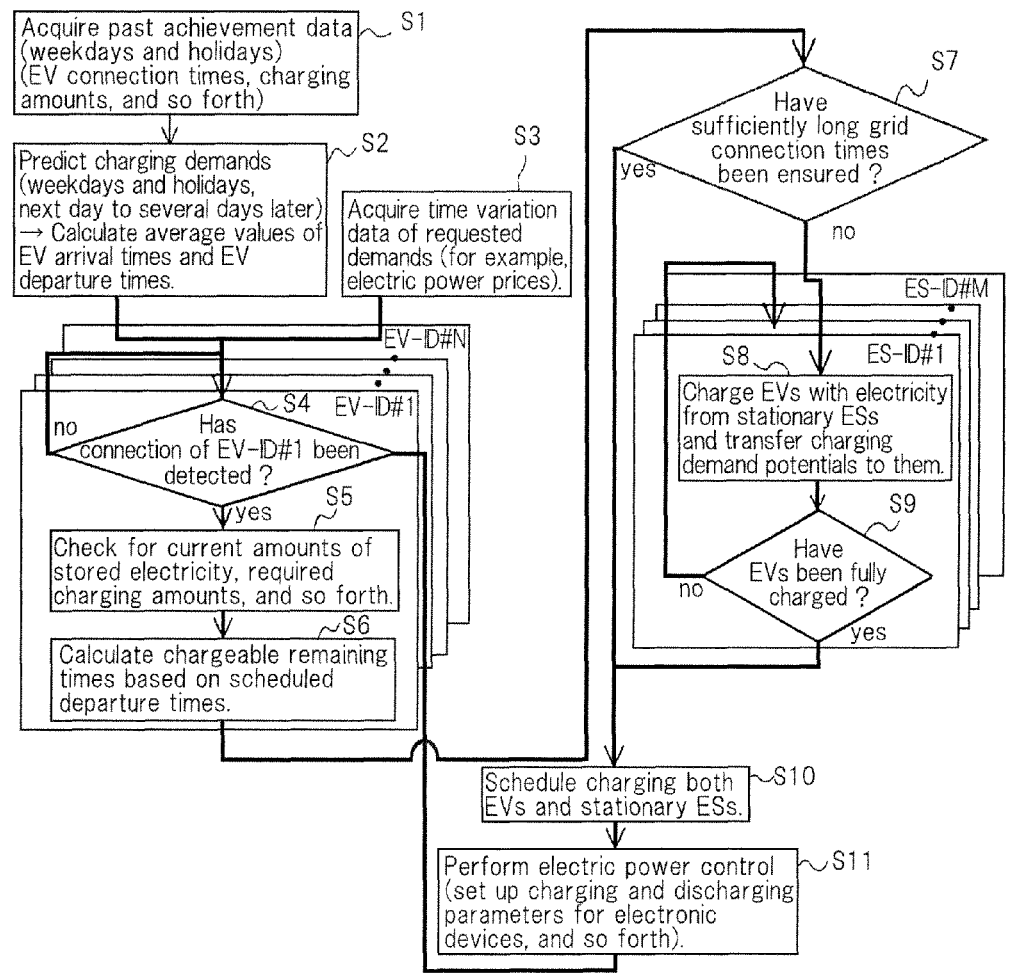
FIG. 4 is a flow chart describing a specific example of a charging control method for the charging control system shown in FIG. 2a and FIG. 2b.

FIG. 4 is a flow chart describing a specific example of the charging control method for the charging control system shown in FIG. 2a and FIG. 2b.

First, past achievement data (both weekdays and holidays) with respect to connection times, amounts of stored electricity, and so forth for individual electric vehicles EV 5a to 5l connected to electric power grid and information communication grid 1 are acquired (at step 1). Thereafter, charging demands at individual times (both weekdays and holidays for several days after the next day) are predicted based on the past achievement data and then the average values (predicted values) of arrival times (charger connection times) and departure times (charger disconnection times) of EVs 5a to 5l are calculated (at step 2).

Along with these calculations, electric power demand request acquisition section 16 acquires time variation data (including electric power prices and so forth) of electric power demands targeted for charging demand control (at step 3).

If connection detection section 12 detects that EVs 5a to 5l is connected to electric power grid and information communication grid 1 (at step 4), stored electricity amount detection section 11 will detect the state of stored electricity of EVs 5a to 5l and acquire information with respect to the current amounts of stored electricity, necessary amounts of stored electricity, and so forth for individual EVs 5a to 5l (at step 5).

Connection end time acquisition section 13 acquires scheduled (predicted) departure times and then chargeable time calculation section 14 calculates chargeable times that are continuous connection assurance times for electric power grid and information communication grid 1 taking into account their margins (at step 6). The scheduled departure times may be acquired from the EV's owner side.

If it is likely that the calculated chargeable time that exceeds a predetermined time cannot be ensured, namely that the EV will depart in a very short time and that the EV cannot be charged with electricity from electric power grid and information communication grid 1 for the predetermined time or longer (at step 7), charging control section 17 will cause the EV to be immediately charged with electricity from a stationary energy storage ES (ID#1) that has been fully charged and electric power charging demand potential that occurs in the EV to be transferred to the stationary energy storage ES (ID#1) (at step 8). Stored electricity amount detection section 11 detects whether or not the stationary energy storage ES (ID#1) has been fully charged with electricity.

If the EV has not been fully charged with electricity (at step 9), it will be charged with electricity from another stationary energy storage ES (ID#2) and the EV will be continuously charged with electricity from stationary energy storages ESs until the EV is fully charged with electricity, namely the electric power charging demand potential that occurs in the EV has been transferred. Stationary energy storages ESs that have not been fully charged with electricity are charged based on the amounts of stored electricity of the stationary energy storages ESs detected by stored electricity amount detection section 11 under the control of charging control section 17.

After the degree of freedom with respect to time shift of the electric power charging demand potential is sufficiently increased, charging scheduling section 15 performs charging scheduling not only for an EV group ensured that their connection times to electric power grid and information communication grid 1 are sufficiently long, but also for a stationary energy storage ES to which the electric power charging demand potential has been transferred based on the electric power demands (at step 10). The charging scheduling can be performed based on any known algorithm.

The processes at steps 8 and 9 are not performed for the EV group ensured that the connection times to electric power grid and information communication grid 1 are sufficiently long.

Last, charging speeds of EVs and charging and discharging speeds of stationary energy storages ESs acquired by the foregoing scheduling are transferred as parameters that vary time after time to the charging and discharging controllers provided in EV chargers and stationary energy storages ESs and thereby electric power demands are controlled (electricity is charged and discharged). The total electric power demand viewed from the electric power grid side at each time is the sum of charging demands of these EVs and stationary energy storages ESs.

As another mode, if few or no EVs are connected to electric power grid and information communication grid 1 and thereby if it is predicted that a time zone in which electric power demands cannot be controlled (dead time) occurs based on the past achievement data and so forth, it is preferable to add a process that causes the EV to be charged with electricity from a stationary energy storage ES that has been fully charged with electricity and it is preferable that an electric power charging demand potential that occurs in the EV to be temporarily transferred to the stationary energy storage ES (ID#1) in a time zone in which many EVs are connected to electric power grid and information communication grid 1 and charging control can be sufficiently performed, namely electric power demands can be controlled to the flow of charging control section 17. Thus, an ES to which an electric power charging demand potential has been transferred can be treated as an EV that has a chargeable remaining time of 24 hours and thereby an electric power demand can be created any time for 24 hours. As a result, a controllable electric power demand can be created in a dead time in which electric power demand cannot be controlled, namely dead time can be eliminated.

According to the present invention, a multiple EV linked charging system and a charging control method that have the following two features and that allow any electric power demand to vary can be provided.

As a first feature, even if connection times during which EVs that are parked in the daytime at temporary parking lots are connected to chargers or to the electric power grid largely vary and thereby the connection times cannot be predicted or connection times are very short, charging demand potentials that occur in the EVs are not wasted, but are effectively used to stabilize the electric power grid anytime for 24 hours. Thus, the quality of the electric power grid stabilization service can be improved. In addition, the likelihood in which EVs have not been fully charged with electricity when they depart can be eliminated and thereby the load and risk imposed on EVs' owners could be alleviated.

As a second feature, in a transitional period of popularization of EVs or even if EV use times are irregularly patterned, occurrence of a time zone in which electric power demands cannot be scarcely controlled, namely electric power demands cannot be provided as electric power adjustment capability to the electric power supply (electric power company) side (dead time) can be suppressed. Thus, the quality of the electric power grid stabilization service can be improved. As a result, the likelihood in which the load (rapid charging, imperfect charging, and so forth) concentrates on a particular EV can be eliminated.

Assuming that an EV is a simple electric power demanding device, since a stationary rechargeable battery is located in parallel with the demanding device in an electric power grid downstream of a power plant and an electrical substation, it becomes similar to the configuration of a system that is provided with only a large capacity stationary rechargeable battery (NaS or the like) in order to stabilize the electric power grid. However, since the stationary rechargeable battery is used so as to support the multiple EV linked charging system that absorbs some variations rather to absorb all variations of electric power generations and demands, the capacity of the stationary rechargeable battery is very small compared to such a system. In an estimation based on a decrease of electric power demands acquired from the simulation result based on the occurrence of a dead time in which electric power demands cannot be controlled as exemplified in FIG. 4b, it can be estimated that the capacity of the stationary rechargeable batteries is around 5% of the total capacity of internal rechargeable batteries of all EVs. If the electric power grid were tried to be stabilized only with stationary rechargeable batteries rather than with the multiple EV linked charging system, stationary rechargeable batteries for the total capacity of internal rechargeable batteries of all the EVs would be located. Instead, according to the present invention, the capacity of the stationary rechargeable batteries becomes around 1/20 of that of the system that does not use the multiple EV linked charging system.

Stationary energy storages 6a to 6i according to this embodiment are the same as EVs 5a to 5l except that stationary energy storages 6a to 6i are stationary, namely they are connected to the electric power grid and information communication grid for 24 hours a day and also EVs 5a to 5l are charged with electricity not through stationary energy storages 6a to 6i. In other words, stationary energy storages 6a to 6i according to this embodiment are used to increase or decrease the number of EVs from standpoint of the electric power grid side in virtual and real time. Thus, unlike the techniques of the related art, it is not necessary to provide a large capacity stationary dischargeable battery, but only stationary dischargeable batteries having a capacity of several % to 10% of that of all EVs. In addition, since the stationary rechargeable batteries are charged or discharged as needed, deterioration of the rechargeable batteries will be remarkably delayed. As a result, cost can be generally reduced.

With reference to the embodiments, the present invention was described. However, it should be understood by those skilled in the art that the structure and details of the present invention may be changed in various manners without departing from the scope of the present invention.

The present application claims priority based on Japanese Patent Application JP 2011-190656 filed on Sep. 1, 2011, the entire contents of which are incorporated herein by reference in its entirety.

What is claimed is:

1. A charging control system that controls charging for a vehicle that runs on electricity, comprising:
    at least one stationary rechargeable means;
    charging means that charges said vehicle or said stationary rechargeable means with electricity;
    detection means that detects states of charge of said vehicle and said stationary rechargeable means;
    charging scheduling means that performs scheduling in which said charging means charges said vehicle based on an electric power demand that causes said charging means to charge said vehicle with electricity; and
    charging control means that controls said charging such that when said charging of said vehicle satisfies a predetermined condition, said vehicle is charged with electricity from said stationary rechargeable means and when the charging of said vehicle does not satisfy the predetermined condition, said vehicle is charged with electricity by said charging means and said stationary rechargeable means is charged with electricity by said charging means based on the state of stored electricity of said stationary rechargeable means detected by said detection means,
    wherein said charging scheduling means performs charging scheduling for said charging means that charges said vehicle and said stationary rechargeable means with electricity also based on an electric power demand created under the control of said charging control means,
    wherein said charging control means controls charging such that if a time zone, in which the number of vehicles charged with electricity by said charging means is equal to or smaller than a predetermined number, occurs, said vehicles are charged with electricity from said stationary rechargeable means in other than the time zone and said stationary rechargeable means is charged by said charging means in the time zone in which the number of vehicles charged with electricity is equal to or smaller than the predetermined number.

2. A charging control method for a charging control system, including: at least one stationary rechargeable means; and charging means that charges a vehicle that runs on electricity, comprising:
    a charging control step that controls charging such that when said charging of said vehicle satisfies a predetermined condition, said vehicle is charged with electricity from said stationary rechargeable means and when the charging of said vehicle does not satisfy the predetermined condition, said vehicle is charged with electricity by said charging means and said stationary rechargeable means is charged with electricity by said charging means based on the state of stored electricity of said stationary rechargeable means; and
    a charging scheduling step that performs charging scheduling for said charging means that charges said vehicle with electricity also based on an electric power demand created by said charging means that charges said vehicle with electricity, said electric power demand including an electric power demand created by charging performed under the control of said charging control step,
    wherein said charging control step controls charging such that if a time zone, in which the number of vehicles charged with electricity by said charging means is equal to or smaller than a predetermined number, occurs, said vehicles are charged with electricity from said stationary rechargeable means in other than the time zone and said stationary rechargeable means is charged by said charging means in the time zone in which the number of vehicles charged with electricity is equal or smaller than the predetermined number.

* * * * *